United States Patent [19]

Hopkins et al.

[11] Patent Number: 4,919,490
[45] Date of Patent: Apr. 24, 1990

[54] VEHICLE WHEEL

[75] Inventors: Mark W. Hopkins, Newark; Frank S. Principe, Hockessin, both of Del.

[73] Assignee: E. I. du Pont de Nemours and Company, Wilmington, Del.

[21] Appl. No.: 258,312

[22] Filed: Oct. 12, 1988

[51] Int. Cl.$^5$ ............................................. B60B 5/02
[52] U.S. Cl. ............................... 301/63 PW; 301/95; 301/104; 301/105 B
[58] Field of Search .......... 301/54, 62, 63 PW, 64 R, 301/67, 74, 95-98, 104, 105 B

[56] References Cited

U.S. PATENT DOCUMENTS

| | | | |
|---|---|---|---|
| 3,656,531 | 4/1972 | Ross et al. | 301/63 PW X |
| 3,917,352 | 11/1975 | Gageby | 301/63 PW |
| 4,030,754 | 6/1977 | Merlette | 301/98 |
| 4,280,736 | 7/1981 | Raudman | 301/63 PW X |
| 4,511,184 | 4/1985 | Schauf et al. | 301/64 R X |
| 4,571,005 | 2/1986 | Nowak et al. | 301/63 PW |
| 4,793,659 | 12/1988 | Oleff et al. | 301/63 PW |

FOREIGN PATENT DOCUMENTS

| | | | |
|---|---|---|---|
| 0195418 | 9/1986 | European Pat. Off. | |
| 3536308 | 4/1987 | Fed. Rep. of Germany | 301/63 PW |
| 0067104 | 4/1984 | Japan | 301/63 PW |
| 0074701 | 4/1987 | Japan | 301/104 |

OTHER PUBLICATIONS

Sales Brochure, Trispoke Composites, Inc., (no date).

Primary Examiner—Russell D. Stormer

[57] ABSTRACT

A wheel formed of a rim joined to a hub by a multi-spoke foam structure that is coated with a fiber reinforced resin material is defined by particular relationships between the spokes and the radiused sections joining the spokes to the hub and the rim.

16 Claims, 2 Drawing Sheets

VEHICLE WHEEL

BACKGROUND OF THE INVENTION

This invention relates to a vehicle wheel and, more particularly, to a fiber reinforced multi-spoke bicycle wheel for use on a standard commercial bicycle frame.

In recent years the sport of bicycle racing has grown dramatically. With this growth has come an increased desire for a competitive advantage. Racers are constantly seeking new ways to go faster.

In 1983, Francesco Moser used a bicycle with two disc wheels to set a new world speed record for the sport of bicycle racing. The disc wheel offers a lower wind resistance than a state-of-the-art spoked wheel. However, the disc wheels, especially when used as a front wheel, present a problem in controlling the bicycle when they are hit with a crosswind or a gust from a passing automobile. This, of course, can be alleviated by using a spoked wheel; however, prior art spoked wheels have a drag factor that results in less than satisfactory performance under racing conditions.

SUMMARY OF THE INVENTION

In order to overcome the difficulty experienced with crosswinds and reduce the drag force encountered with prior known spoked wheels, a wheel has been developed that comprises a circular member, a hub and a plurality of elongated spokes connected between the hub and the circular member. Each of the spokes is defined by an aerodynamic profile and a width to thickness aspect ratio of greater than 3.0 (preferably about 3.8). The circular member which is capped by a rim has an aerodynamically shaped leading edge directed toward the hub and a width to thickness aspect ratio greater than 2.6 (preferably about 2.9). The spokes, preferably three, having equal shapes and dimensions and spaced at 120° intervals emanate radially from the hub and at one end are joined to the hub by radiused sections that have a radius about equal to the width of a spoke. At the other end the spokes are joined to the circular member by radiused sections that have a radius about equal to one-half the width of a spoke.

Preferably the wheel has a foam core covered with a fiber reinforced resin having a surface finish less then 16 rms. Suitable resins can be either thermosetting or thermoplastic resins. The reinforcing fiber can be carbon, glass, aramid, polyethylene, extended chain polyethylene or various combinations thereof.

DETAILED DESCRIPTION OF THE PREFERRED EMBODIMENT

Figure 1:
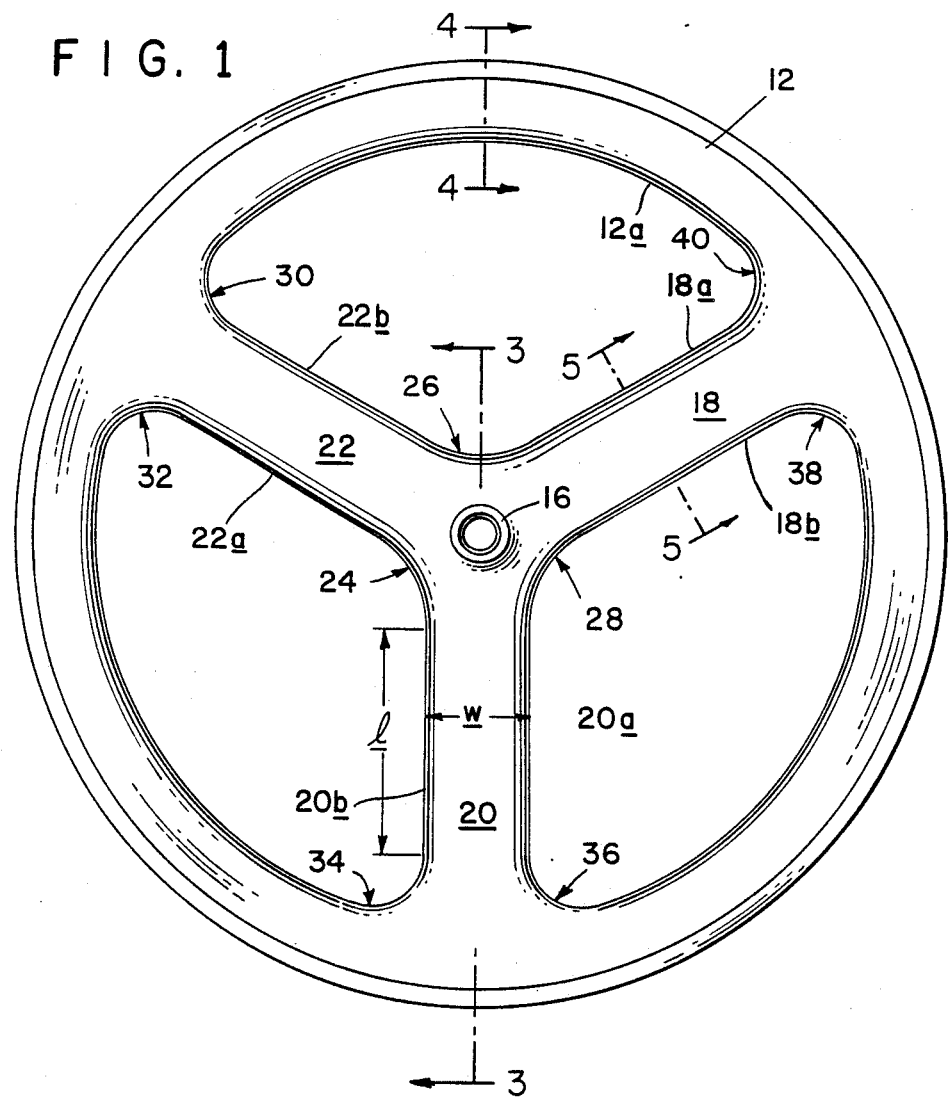
FIG. 1 is a side elevational view of a Vehicle Wheel showing my new design.
Figure 2:
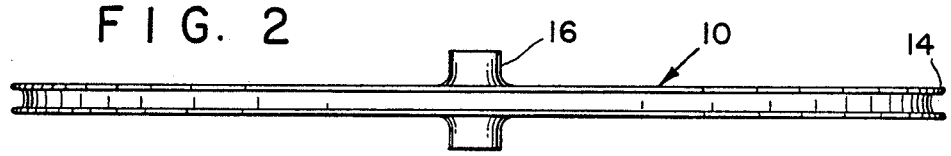
FIG. 2 is an end elevational view of the same.
Figure 3:
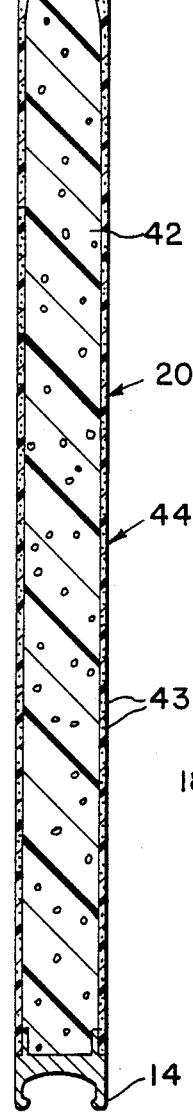
FIG. 3 is a cross-sectional view taken along line 3—3 of FIG. 1.
Figure 3:
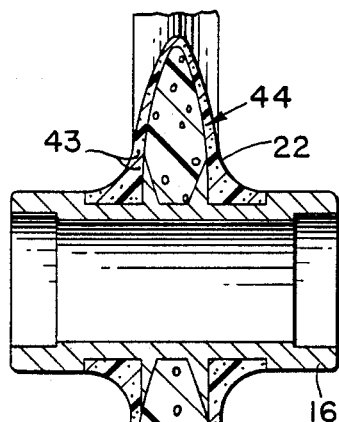
Figure 4:
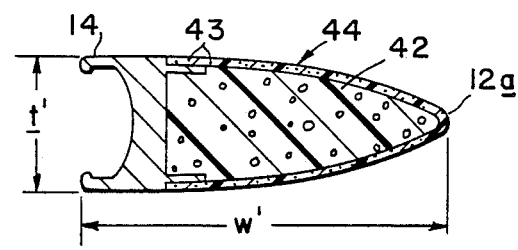
FIG. 4 is a cross-sectional view taken along line 4—4 of FIG. 1.
Figure 5:
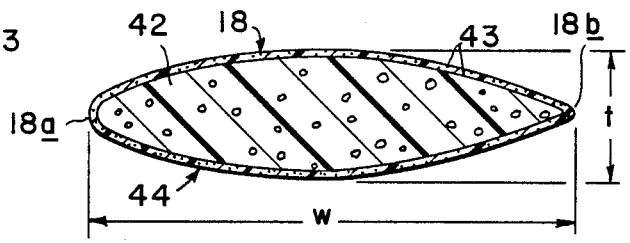
FIG. 5 is a cross-sectional view taken along line 5—5 of FIG. 1.

Referring to the drawings, the wheel 10 chosen for purposes of illustration includes a circular member 12 capped with rim 14, a hub 16 and three radial spokes 18, 20 and 22 connecting the hub 16 to the circular member 12. Each of the spokes has a leading and trailing edge designated by the individual spoke element number followed by a or b, respectively. For example, spoke 18 has a leading edge 18a and a trailing edge 18b. Each spoke is defined by an aerodynamic profile as best seen in FIG. 5 and has equivalent lengths l, widths w and maximum thickness t. The spokes are each further defined as having an aspect ratio which is the ratio of width w to maximum thickness t of greater than 3.0 throughout the length l of the spoke. The circular member 12 has an aerodynamically shaped leading edge 12a and an aspect ratio which is the ratio of width w' to thickness t' (FIG. 4) of greater than about 2.6. The spokes are joined to the circular member 12 by radiused sections 30, 32, 34, 36, 38 and 40, each having a radius that is about equal to one-half the width w of a spoke. In the same manner the spokes are joined to the hub 16 by radiused sections 24, 26 and 28, each having a radius that is about equal to the width w of the spokes.

The wheel is defined by a foam core 42 attached to the hub 16 and the rim 14 coated with resin layer 44 that is reinforced with fibers 43.

In a series of wind tunnel tests simulating cross wind conditions at normal racing speeds, wheels made according to the invention were found to have a surprisingly low drag and exhibited stable handling when installed on a bicycle.

In the preferred embodiment illustrated in FIGS. 1-5, the spokes have a curved profile represented by a substantial portion of an air foil profile of the type disclosed in the Theory of Wing Sections Including a Summary of Airfoil Data by I. H. Abbott and A. E. Von Doenhoff. Dover Publications (pages 312–379) which is incorporated herein by reference.

EXAMPLE

An aluminum rim and an aluminum hub similar to those shown in FIGS. 1-5 are positioned in a foam core mold having a configuration capable of forming the wheel shown in FIGS. 1-5. The hub is placed concentric with the rim. Adhesive (605 by Adteck Company) was applied to the surfaces of the rim and hub which contact the foam to insure good bonding. A commercial grade polyurethane XRS-8705 purchased from Rubicon Chemical is injected into the mold. The foam expands and bonds to the rim and hub and is allowed to cure at 140° F. for 15 minutes. The molded foam wheel is removed from the mold.

Six pieces of carbon fiber fabric (3K plain weave, 5 oz./sq. yd., style N342 from North American Textile) are cut to fit over the molded foam. Each piece was large enough to cover recesses in the hub and rim and the exposed foam. Four pieces of the fabric are cut in a way that the fibers are oriented at ±45° to the long direction of one of the spokes. The other two layers are cut so that the warp fibers are parallel to the long direction of the spoke. Next, identical stacks, each containing three layers of fabric, are made, one for each side of the wheel. In each stack the layer of fabric next to the foam is oriented so that the fibers are placed at ±45° to the long direction of a spoke. In the next layer of fabric the warp fibers are oriented parallel to the same spoke. The third layer is oriented in the same direction as the first with the fibers at ±45° to the spoke. The stacks are placed against the wheel, one on each side. A carbon fiber veil (1 oz./sq. yd.) was wrapped around each spoke and metal staples are used to keep the veil and fabric attached to the foam core. Last, a nylon thread is wrapped around the rim to keep the fabric and veil firmly against the foam core.

An adhesive (605 by Adteck) is applied to the surfaces of the aluminum hub which are to come in contact with the carbon fabric. Next, the carbon fabric is placed on each side of the molded foam wheel, resin (Dow 530 vinyl ester resin system) is poured in the bottom of the mold, trickling it out over as much of the mold as possible. The molded foam three spoked wheel with fabric attached is placed into the mold and resin is trickled on top of the wheel. The mold is closed and resin (stored at room temperature) is pumped into the mold for about six minutes at 10–20 psi inlet pressure. The mold temperature is 180°–200° F. The wheel is allowed to cure in the mold for thirty minutes. Then the wheel is removed from the mold, deflashed and sanded until smooth. The aspect ratio of the spokes and the rim was 3.78 and 2.87, respectively.

What is claimed is:

1. A wheel comprising: a circular member, a hub concentric with said circular member, and a plurality of elongated spokes connected between said hub and said circular member, each of said spokes having a leading and a trailing edge, an aerodynamic profile, and an aspect ratio greater than about 3.0 said aspect ratio being constant throughout the length of the spoke.

2. The wheel as defined in claim 1, said circular member having an aerodynamic shaped edge directed toward said hub and an aspect ratio greater than about 2.6.

3. The wheel as defined in claim 1 wherein said aspect ratio of the spoke is about 3.8.

4. The wheel as defined in claim 2 wherein the aspect ratio of the circular member is about 2.9.

5. The wheel as defined in claim 2 wherein the spokes are joined to the circular member by radiused sections having a radius that is about equal to one-half the width of the spoke.

6. The wheel as defined in claims 1, 2, 3, 4 or 5 wherein said wheel is formed of a foam core coated with a fiber reinforced resin material.

7. The wheel as defined in claim 6 wherein said resin is a thermosetting resin, said fiber being carbon fiber.

8. The wheel as defined in claim 2 wherein the spoke is joined to the hub by radiused sections having a radius that is about equal to the width of the spoke.

9. The wheel as defined in claims 1, 2, 3, 4 or 5 wherein there are three spokes.

10. The wheel as defined in claim 6 wherein said fiber is glass.

11. The wheel as defined in claim 6 wherein said fiber is a combination of carbon and glass fibers.

12. The wheel as defined in claim 6 wherein said fiber is an aramid fiber.

13. The wheel as defined in claim 6 wherein said fiber is a blend of carbon, glass, polyethylene, extended chain polyethylene and aramid fibers.

14. The wheel as defined in claim 1 wherein the surface of said wheel has a surface finish less than about 16 rms.

15. The wheel as defined in claim 6 wherein said fiber is polyethylene.

16. The wheel as defined in claim 6 wherein the fiber is extended chain polyethylene.

* * * * *